United States Patent [19]

Takemori et al.

[11] Patent Number: 5,635,183
[45] Date of Patent: Jun. 3, 1997

[54] CHOCOLATE WITH IMPROVED AND ENRICHED AROMA, AND A PROCESS OF ITS PRODUCTION

[75] Inventors: Toshio Takemori, Tokyo; Toshinobu Tsurumi, Saitama; Masanori Ito, Saitama; Tatsuya Kamiwaki, Saitama, all of Japan

[73] Assignee: Lotte Company Limited, Tokyo, Japan

[21] Appl. No.: 220,224

[22] Filed: Mar. 30, 1994

[30] Foreign Application Priority Data

Jul. 13, 1993 [JP] Japan ................................. 5-173028

[51] Int. Cl.⁶ ............................. A61K 35/78; A23G 1/00
[52] U.S. Cl. ....................... 424/195.1; 426/593; 426/631
[58] Field of Search .......................... 424/195.1; 426/631, 426/593

[56] References Cited

U.S. PATENT DOCUMENTS

| | | | |
|---|---|---|---|
| 4,758,444 | 7/1988 | Terauchi | 426/593 |
| 5,009,917 | 4/1991 | Wiant et al. | 426/631 |

FOREIGN PATENT DOCUMENTS 56975  12/1986  Japan.

Primary Examiner—John W. Rollins
Attorney, Agent, or Firm—Young & Thompson

[57] ABSTRACT

A raw material cacao for chocolate may be improved and enriched in its aroma, thereby providing a chocolate whose consumption results in increased mental concentration, and which has an improved cacao aroma and reduced sweetness. The chocolate of the invention is produced by using the improved and enriched cacao nibs produced by an alkali-treatment of cacao beans. The process for producing the chocolate using cacao nibs of improved and enriched aroma comprises removing shells and germs from raw or semi-roasted cacao beans to prepare cacao nibs, adding an alkali thereto and stirring for reaction thereof with the alkali, subsequently drying and roasting the same and finally grinding and pulverizing the alkali-treated cacao nibs to prepare a cacao mass to be used for producing the chocolate in the conventional way. The alkali is preferably calcium hydroxide.

2 Claims, 9 Drawing Sheets

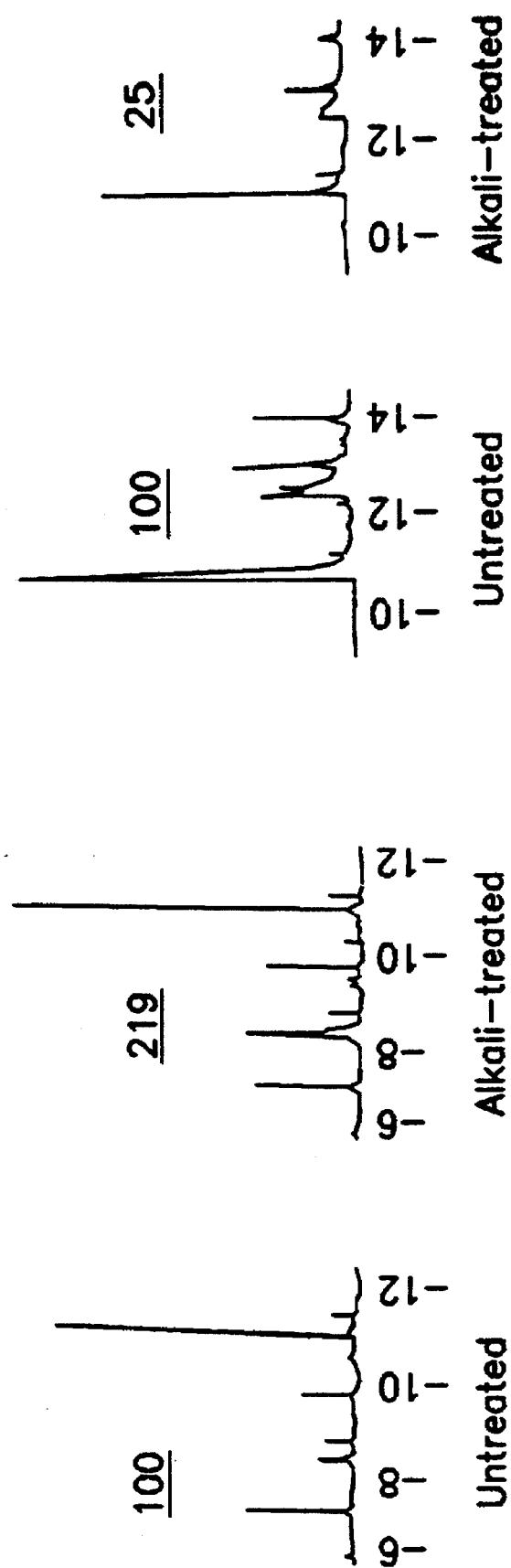

FIG. 2A
- Conventional Choco. 24.5%
- Neither 15.5%
- Inventive Choco. 60.0%

FIG. 2B
- Conventional Choco. 28.0%
- Neither 28.0%
- Inventive Choco. 44.0%

FIG. 2C
- Conventional Choco. 65.0%
- Neither 17.0%
- Inventive Choco. 18.0%

| Ca(OH)$_2$ 53.0% | Neither 12.0% | K$_2$CO$_3$ 35.0% |

FIG. 7A

| Ca(OH)$_2$ 57.0% | Neither 15.0% | K$_2$CO$_3$ 28.0% |

FIG. 7B

| Ca(OH)$_2$ 23.0% | Neither 25.0% | K$_2$CO$_3$ 52.0% |

FIG. 7C

| Ca(OH)$_2$ 54.0% | Neither 24.0% | K$_2$CO$_3$ 22.0% |

FIG. 10A

| Ca(OH)$_2$ 55.0% | Neither 24.0% | K$_2$CO$_3$ 21.0% |

FIG. 10B

| Ca(OH)$_2$ 27.0% | Neither 18.0% | K$_2$CO$_3$ 55.0% |

FIG. 10C

CHOCOLATE WITH IMPROVED AND ENRICHED AROMA, AND A PROCESS OF ITS PRODUCTION

BACKGROUND OF THE INVENTION

The invention relates to a chocolate of reduced sweetness and to a process of producing the same, in which the flavor of main raw cacao material for the chocolate is improved to enrich the cacao.

For the purpose of producing a chocolate, there have been neither ideas nor practices for treating the material cacao with alkali. Heretofore, the cacao has been treated with alkali for another purpose, that is merely to improve an aroma, color, dispersibility in water and the like of cocoa powder.

Further, there have been several cases of the alkali-treatment of cacao other than production of cocoa powder. For example, an attempt of treating the cacao with an aqueous solution of weakly alkaline salt for the purpose of sterilization is disclosed in the Japanese Patent Publication No. 291233/1990. An attempt of neutralizing organic acids with ammonia for the purpose of improvement in aroma of cacao beans of low grade is disclosed in the Japanese Patent Publication No. 56975/1986. An attempt of increasing water-dispersibility of chocolate for food materials used in a pudding or jelly is disclosed in the Japanese Patent Publication No. 10094/1986.

On the other hand, a roasting process of cacao in which an alkali, a reducing sugar, amino acids and tannin are added to a cacao mass or nibs of specified pH is disclosed in the Japanese Patent Publication No. 31493/1978. According to this process, composition of raw cacao beans must be determined prior to adding a required amount of the above additives, resulting in a complicated process which cannot sufficiently improve the aroma of cacao.

This prior art had different purposes from that of the present invention in which a further rich aroma may be extracted from cacao beans of high grade to increase cacao aroma and to produce a chocolate of reduced sweetness. Further, in the prior art neither convenient operation nor enough development of aroma may be achieved.

SUMMARY OF THE INVENTION

Accordingly, an object of the invention is to improve the aroma of a main raw cacao material for chocolate. Another object of the invention is to produce a chocolate of reduced sweetness having a richer aroma of the improved cacao.

The above and other objects, features and advantages of the invention will be apparent from the following descriptions.

In order to achieve the above objects, the invention provides a method of improving and enriching an aroma of cacao nibs useful for chocolate, which comprises treating the cacao nibs of raw or semi-roasted cacao beans with an alkali.

Further, the invention provides a process for producing a chocolate using cacao nibs of improved and enriched aroma, which comprises removing shells and germs from raw or semi-roasted cacao beans to prepare cacao nibs, adding an alkali thereto and stirring for reaction thereof with the alkali, subsequently drying and roasting the same, and finally grinding and pulverizing the alkali-treated cacao nibs to prepare a cacao mass which is used for producing the chocolate in the conventional way.

According to the invention, there is further provided a chocolate produced from the cacao nibs of improved and enriched aroma, which comprises the cacao mass prepared by the process as described in the above and other conventional raw materials for chocolate.

BRIEF DESCRIPTION OF THE DRAWINGS

FIG. 1 is a graph showing results of gas-chromatographic analysis.

FIG. 2 is an illustration showing results of preference tests for chocolate.

FIG. 7 is an illustration showing results of preference tests for chocolate.

FIG. 10 is an illustration showing results of preference tests for chocolate.

EMBODIMENTS

Figure 3:
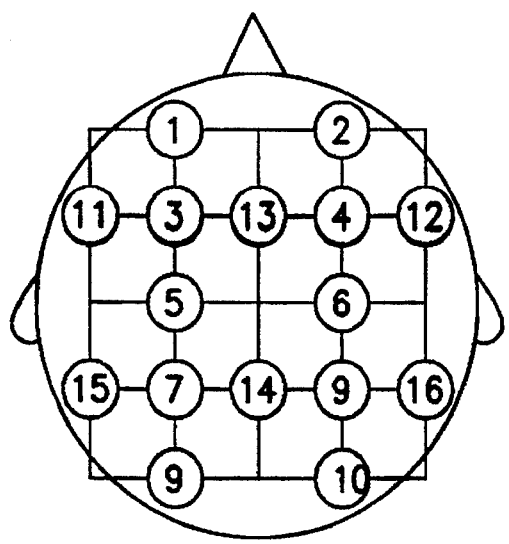
FIG. 3 is an illustration showing arrangement of electrodes on the head for determining brain waves.

In accordance with the invention, an alkali to be used for the alkali-treatment of said cacao-nibs may be potassium carbonate, sodium carbonate, potassium bicarbonate, sodium bicarbonate, ammonium hydroxide, ammonium carbonate, magnesium oxide, magnesium carbonate or the like. Calcium hydroxide is especially preferred, which has never been utilized for the alkali-treatment of cacao.

Types, sizes and conditions of cacao beans to be used in the present invention, such as an extent of fermentation, a water content, an organic acid concentration and the like are not critical and may be every types of material cacaos for conventional chocolates. The present invention is not intended to improve a lower grade of cacao or worst beans of insufficient fermentation, but be intended to positively extract aroma of a higher grade of cacao. Better results may therefore be achieved with the higher grade of cacao beans.

For the alkali-treatment of the cacao nibs, an amount of the alkali, particularly calcium hydroxide as added, may be in the range of from 0.2 to 3.0% by weight relative to the cacao nibs preferably in the range of from 1.0 to 2.0% by weight. With an amount of lower than 0.2%, a sufficient effect of reducing a bad odor or developing a favorable aroma cannot be expected, while a strong alkali-odor may be developed with an amount of higher than 3.0%, resulting in disruption of aroma balance.

The reaction of the alkali, particularly calcium hydroxide, with the cacao nibs is preferably carried out in the presence of water. The condition of reaction may be preferably at a temperature in the range of from 40° to 210° C. and under a pressure in the range of from 1 to 5 atm. In the course of the reaction, not only the nibs may simply be mixed with the alkali but also the reaction may advantageously be accelerated by applying pressure and temperature in the presence of water.

After the alkali-treatment, the cacao nibs may be dried, roasted, ground and milled to produce a cacao mass in the conventional manner. Thereafter, a general process may be employed to produce chocolate.

In accordance with the invention, it is critical that the alkali-treatment should be conducted before the roasting step. By performing the alkali-treatment before the roasting process the alkali may be reacted with a precursor of an aroma ingredient to generate an aroma during the roasting step and to maintain a favorable pH value for promoting the Maillard reaction, namely an aroma-developing mechanism. If the alkali-treatment is carried out after the roasting step to the contrary, the aroma ingredient itself is reacted with the alkali to change a good aroma generated in the roasting process into a different flavor due to the alkali-treatment, so that the better cacao aroma and the enhancement of mental concentration cannot be achieved.

In accordance with the present invention, the raw material cacao for chocolate may be improved and enriched in its aroma, thereby providing the chocolate with the increased mental concentration and the improved cacao aroma. This fact is supposed to occur because the alkali, particularly calcium hydroxide, causes a hemicellulose, which constitutes a tissue of cacao beans as well as a protein and a starch to hydrolyze accompanied with the precursor of aroma such as amino acids and sugars being released, resulting in an increased amount of the aroma.

The use of the cacao beans thus alkali-treated in the chocolate may increase the aroma ingredient of cacao and decrease an unfavorable odor, thereby producing a superior chocolate with reduced sweetness and higher preference.

Further, it has been found from the results of experiments that the improved and enriched flavor contributes to the enhancement of mental concentration. Consequently, the chocolate produced by using the cacao nibs with the improved and enriched aroma may increase its mental concentrating effect.

In accordance with the present invention, the raw material cacao for chocolate may be improved and enriched in its aroma, thereby providing the chocolate with the increased mental concentration, the improved cacao aroma and the reduced sweetness. The chocolate produced by using the cacao nibs with the improved and enriched aroma can increase its mental concentrating effect.

(Example 1: Production of Cacao Nibs Treated with Calcium Hydroxide)

Cacao nibs were added with 1.5% of calcium hydroxide to be stirred at 130° C. under 1 atm for 20 minutes for subsequent dry and roast treatments to produce the cacao nibs treated with calcium hydroxide.

(Experiment 1)

The chocolate according to the invention is characterized by the enriched favorable aroma together with the reduced bad odor as compared with the conventional type of chocolate. In fact, a result of gas-chromatographic analysis for the cacao mass treated with alkali with respect to Example 1 as compared with untreated cacao mass is shown in FIG. 1. It has been found that a content of pyrazine or aroma ingredient of cacao was increased more than doubly, while a content of volatile organic acids or origin of the bad odor was suppressed to the level of about a quarter of that of the conventional type.

(Example 2: Production of Chocolate Using Cacao Nibs Treated with Calcium Hydroxide)

The cacao nibs prepared by the process of Example 1 was ground to form a cacao mass to be thoroughly mixed with sugar, a whole powder milk and a portion of cocoa butter, for roll-milling thereof and subsequent addition with the remaining cocoa butter, emulsifier and flavor and a further concinnating process so as to prepare a chocolate body to be finally shaped into a chocolate product.

(Comparative Example 1)

The process of Example 2 was repeated except for using the conventional ingredients instead of those in Example 2 to produce a chocolate product.

(Experiment 2)

A preference test of chocolate was carried out to two hundred panelists of high school girls with using the chocolates of Example 2 and Comparative Example 1 as samples. The results are shown in FIG. 2.

As apparent from FIG. 2, the chocolate according to the invention was significantly preferred in view of the taste and aroma and had the reduced sweetness.

(Experiment 3)

An enhancing test of mental concentration for chocolate was carried out to a panel consisting of twenty university students with using the chocolates of Example 2 and Comparative Example 1 as samples.

Figure 4A:
FIG. 4 shows graphs of correlation between the shapes of the brain waves.
Figure 4B:
Figure 4C:
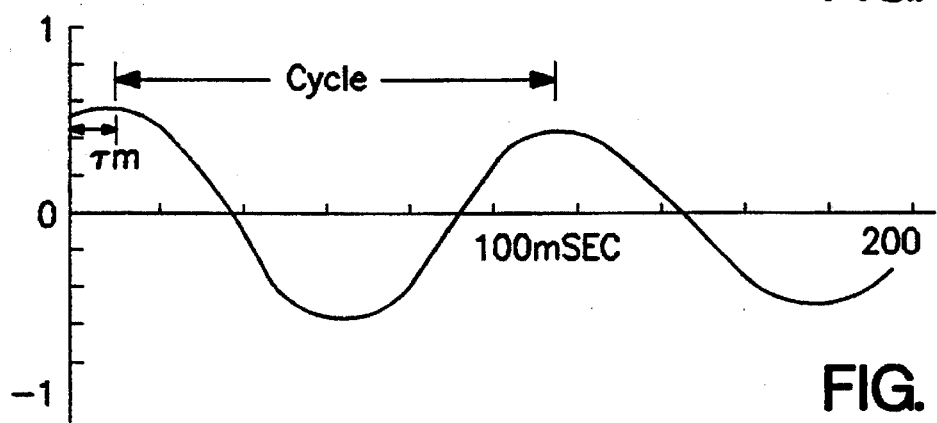

The term "mental concentration" means one of significant psychological effects for improving efficiencies of study and working. A degree of the mental concentration may be determined by a brain wave such as $\alpha$-wave at its time point. As shown in FIG. 3, such brain wave may be measured by a micro-electric current generated at the brain activity with using electrodes attached to the person's head. In order to measure the brain wave, the correlation of the shapes between brain waves such as $\alpha$-wave of the frontal lobe (area 1 as shown in FIG. 3) and the occipital lobe (area 9 as shown in FIG. 3) is calculated to give a time up to a first peak $\tau m$ (see FIG. 4). In FIG. 4, as the mental concentration is improved, a value $\tau m$ decreases.

Figure 5:
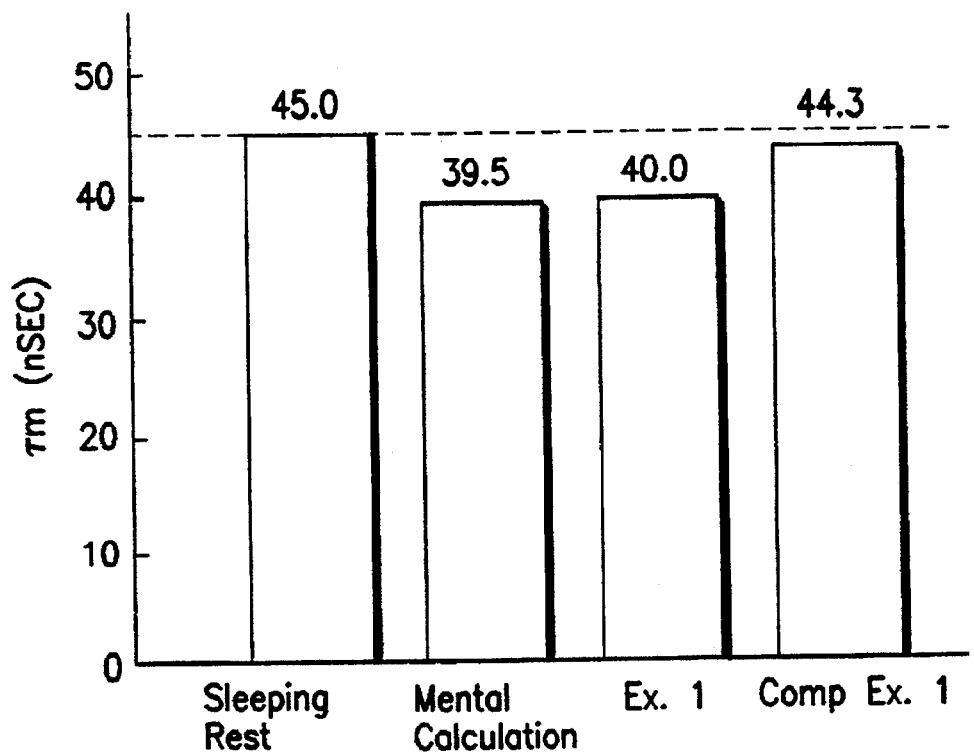
FIG. 5 is a graph showing enhancement of mental concentration by means of the determination of brain waves.

After smelling the aroma of the chocolates according to Example 2 and Comparative Example 1, the brain waves of the panelists were determined and shown in FIG. 5. As apparent from FIG. 5, the value ($\tau m=40.0$) of the chocolate according to the invention is lower than a value $\tau m$ of 44.3 of Comparative Example. This indicates that the chocolate of Example 1 enhances the mental concentration. With reference to two graphs as shown in the right of FIG. 5, the brain wave in the sleeping rest state as an index of unconcentrated condition and the wave in the mental calculation as an index of concentrated condition were measured for their m values wherein the brain waves were determined upon smelling neither chocolate aroma. By comparing these values, it will be apparent that the enhancement of the mental concentration by the chocolate of Example 2 approximates to $\tau m$ value 39.5 at the time of mental calculation.

(Experiment 4)

A proof-reading test of English Vocabulary was carried out for the chocolates of Example 2 and Comparative Example 1 employing a panel consisting of one hundred fifty five women college students. Some questions are raised from Table 1, in which the proof-reading test was carried out in such a manner that correct words were listed in the left while incorrect words including a single mistaken letter to be corrected were arranged in the right.

Figure 6:
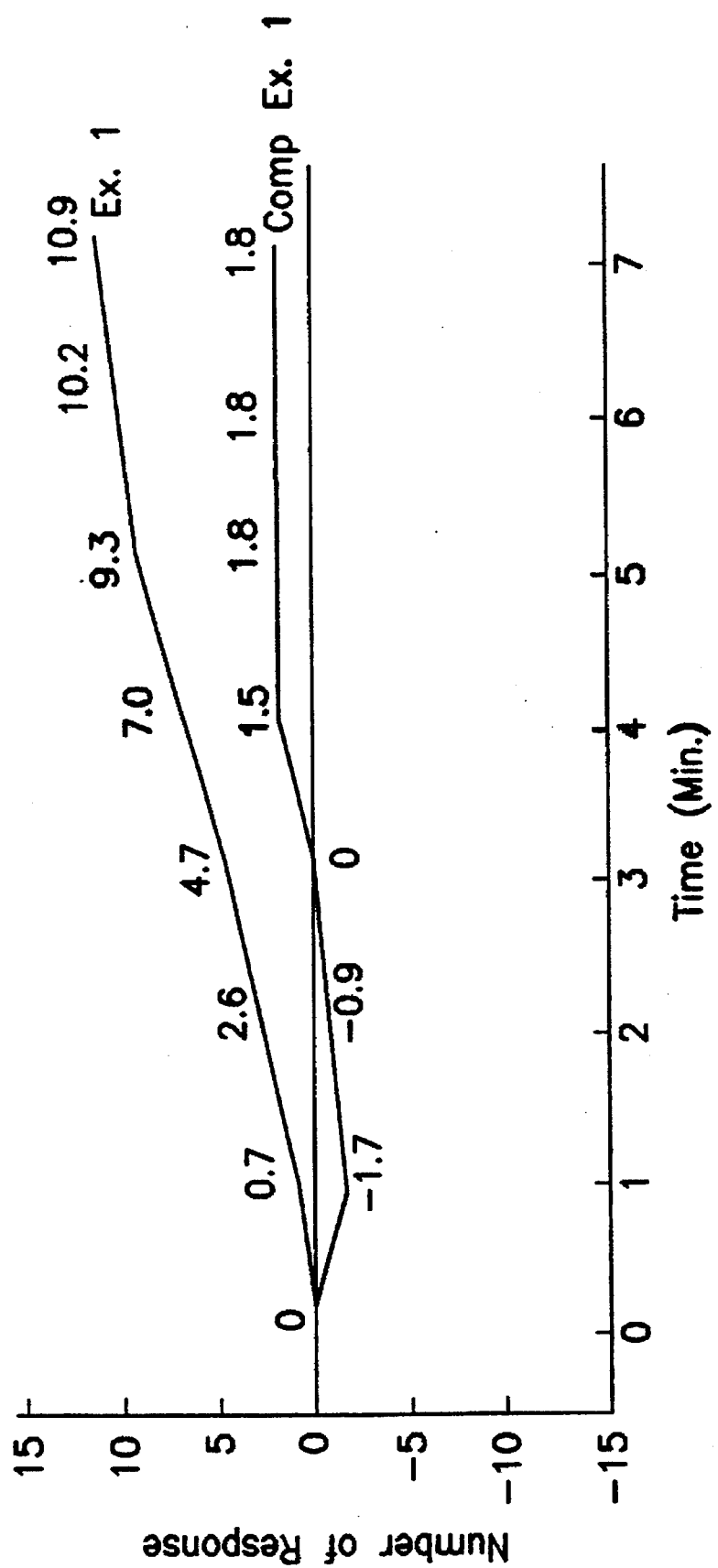
FIG. 6 is a graph showing results of proof-reading tests for English Vocabulary.

After eating the chocolates of Example 2 and Comparative Example 1, the number of responses was recorded. The results are given in FIG. 6 wherein the ordinate shows the number of responses after eating the chocolate minus the number of responses without eating any chocolate, while the abscissa shows the time for response. The number of responses after eating the chocolate according to the present invention increases from one minute after the eating. The number of responses in seven minutes after eating the inventive chocolate increases six times that of Comparative Example 1. It could be understood that efficiency of working is considerably improved as compared with those eating the chocolate of Comparative Example 1.

(Example 3: Production of Cacao Nibs Treated with Calcium Hydroxide)

Cacao nibs were added with 1.0% of calcium hydroxide to be stirred at 130 ° C. under 1 atm to 20 minutes for dry and subsequent roasting treatments to provide the cacao nibs treated with calcium hydroxide.

(Example 4: Production of Chocolate Using Cacao Nibs Treated with Calcium Hydroxide)

The cacao nibs prepared by the process of Example 3 were subjected to a grind to form a cacao mass to be thoroughly mixed with sugar, a whole powder milk and a portion of cocoa butter for roll-milling thereof and addition with the remaining cocoa butter, emulsifier and flavor, and subsequent concinnating process to prepare a chocolate body to be finally shaped into a chocolate product.

(Example 5: Production of Cacao Nibs Treated with Potassium Carbonate)

Cacao nibs were added with 1.0% of potassium carbonate and stirred at 130° C. under 1 atm to 20 minutes for dry and subjected to subsequent roasting treatments to provide the cacao nibs treated with potassium carbonate.

(Example 6: Production of Chocolate Using Cacao Nibs Treated with Potassium Carbonate)

The cacao nibs prepared by the process of Example 5 were subjected to a grind to form a cacao mass to be thoroughly mixed with sugar, a whole powder milk and a portion of cocoa butter for roll-milling and subsequent addition with the remaining cocoa butter, emulsifier and flavor, and a further concinnating process to prepare a chocolate body to be finally shaped into a chocolate product.

(Experiment 5)

A preference test of chocolate was carried out on a hundred panelists of high school girls using the chocolates of Example 4 and Example 6. The results are shown in FIG. 7. As apparent from FIG. 7, calcium hydroxide is superior to potassium carbonate as the alkali to be used for the alkali-treatment of the invention.

(Experiment 6)

An enhancing test of the mental concentration for chocolate was carried out on twenty panelists of university students using the chocolates of Example 4 and Example 6. The process of Experiment 3 was repeated.

Figure 8:
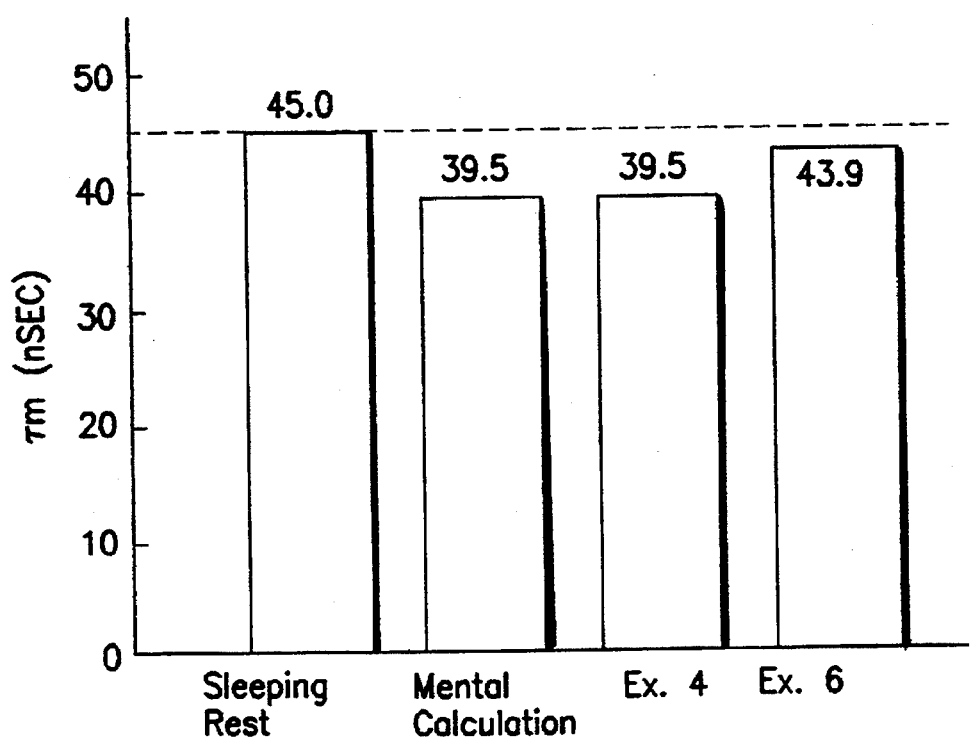
FIG. 8 is a graph showing enhancement of mental concentration by means of the determination of brain waves.

After smelling the aroma of the chocolates of Examples 4 and 6, the brain waves of the panelists were determined and shown in FIG. 8. As apparent from FIG. 8, the value $\tau m$ of 39.5 of the chocolate of Example 4 according to the invention is much lower than a value $\tau m$ of 43.9 of Example 6. This indicates that the chocolate of Example 4 enhances the mental concentration. With reference to two graphs as shown in the right of FIG. 8, the brain wave in the sleeping rest state as an index of unconcentrated condition, and the wave in the mental calculation as an index of concentrated condition were measured for their $\tau m$ values wherein the brain waves were determined upon smelling neither chocolate aroma. By comparing these values, it will be apparent that the enhancement of the mental concentration by the chocolate of Example 4 approximates to $\tau m$ value of 39.5 at the time of mental calculation.

(Experiment 7)

A proof-reading test of English Vocabulary was carried out with the chocolates of Example 4 and Example 6 on a hundred fifty panelists of women college students. The process of Experiment 4 was repeated. The results are shown in FIG. 9.

Figure 9:
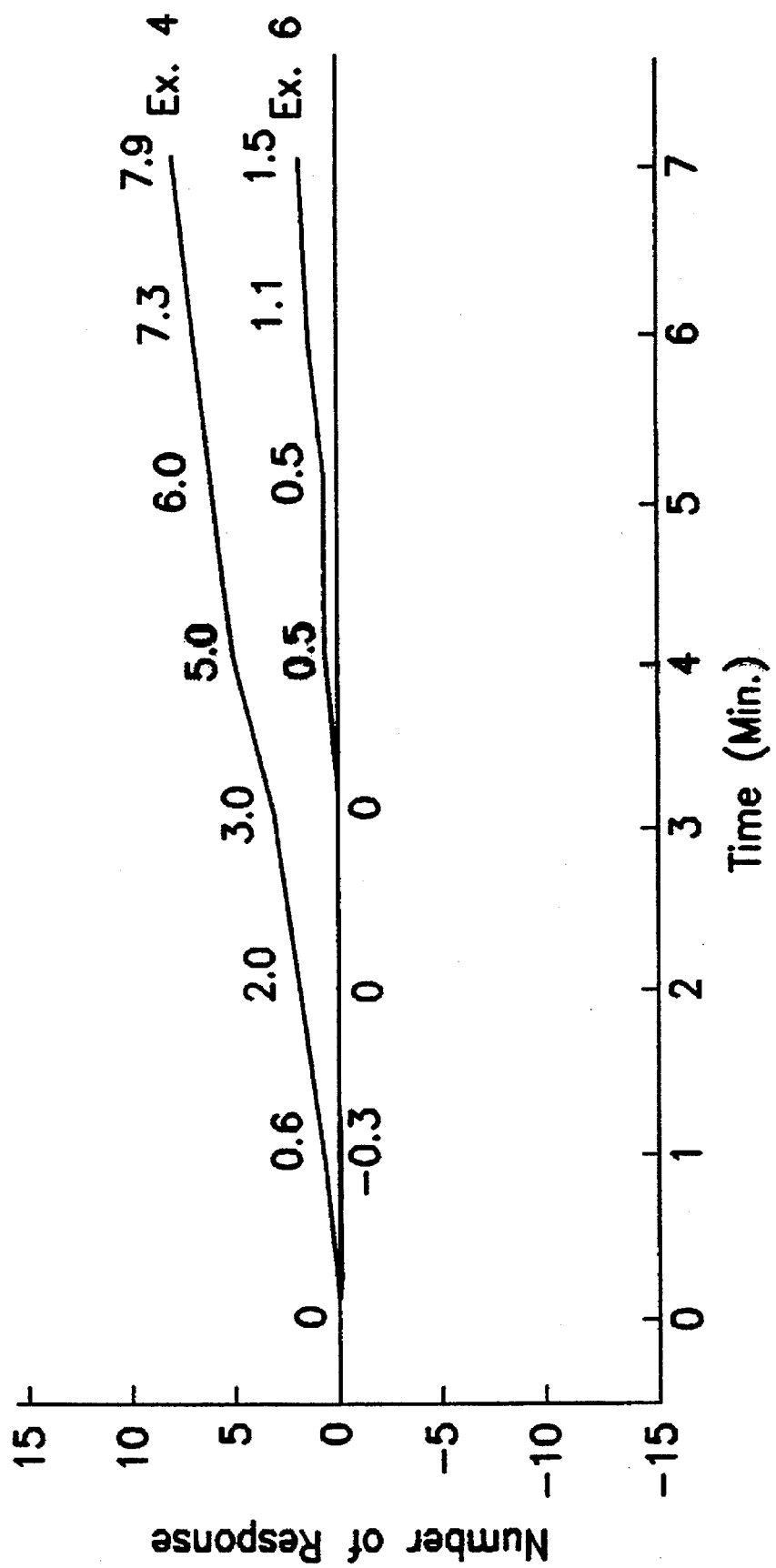
FIG. 9 is a graph showing results of proof-reading tests of English Vocabulary.

As apparent from FIG. 9, the number of responses in seven minutes after eating the chocolate of Example 4 increases to five times that of the chocolate of Example 6. This shows the surprisingly improved efficiency of working.

(Example 7: Production of Cacao Nibs Treated with Sodium Carbonate)

Cacao nibs were added with 1.0% of sodium carbonate to be stirred at 115° C. under 1 atm to 20 minutes for dry and were subjected to subsequent roasting treatments to provide the cacao nibs treated with sodium carbonate.

(Example 8: Production of Chocolate Using Cacao Nibs Treated with Sodium Carbonate)

The cacao nibs prepared by the process of Example 7 were subjected to a grind to form a cacao mass to be thoroughly mixed with sugar, a powdered whole milk and a portion of cocoa butter for roll-milling and subsequent addition with the remaining cocoa butter, emulsifier and flavor and a further concinnating process to prepare a chocolate body to be finally shaped into a chocolate product.

(Experiment 8)

A preference test of chocolate was carried out on a hundred panelists of high school girls using the chocolates of Examples 4 and 8. The results are shown in FIG. 10.

As apparent from FIG. 10, calcium hydroxide is superior to sodium carbonate as the alkali to be used for the alkali-treatment of the invention.

(Experiment 9)

The enhancing test of the mental concentration for chocolate was carried out on twenty panelists of university students using the chocolates of Examples 4 and 8. The process of Experiment 3 was repeated.

Figure 11:
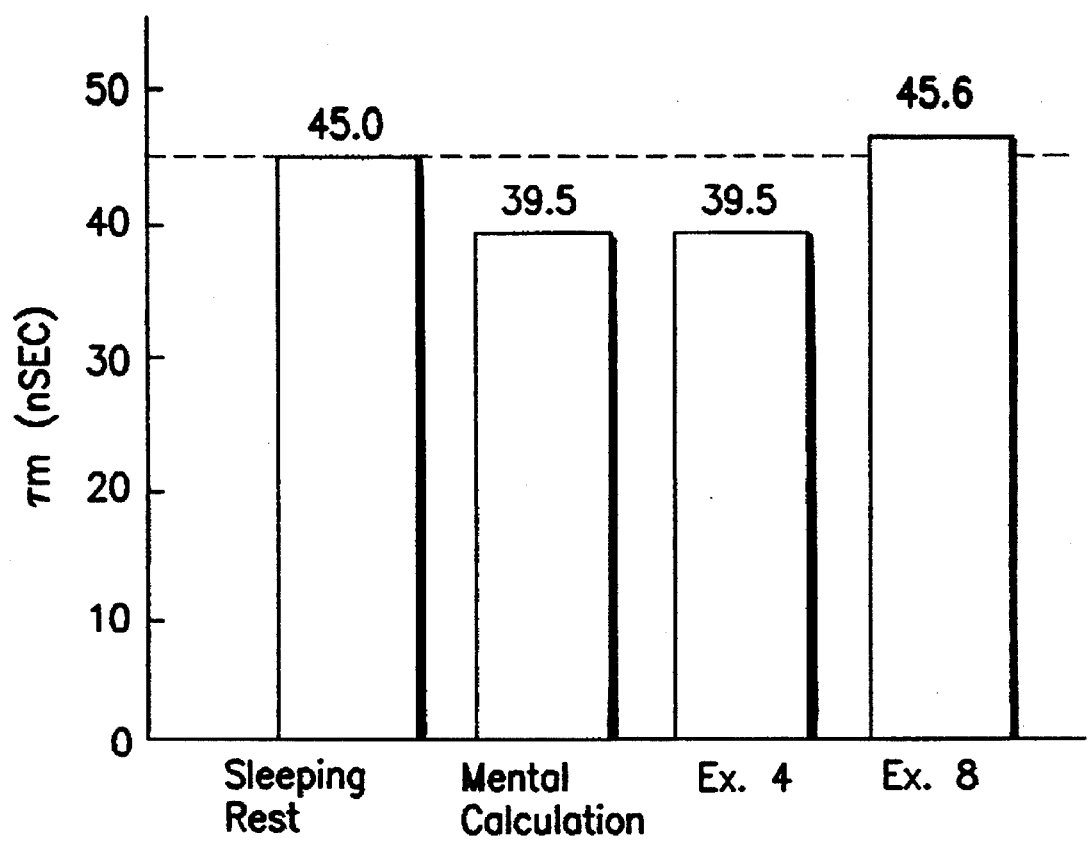
FIG. 11 is a graph showing enhancement of mental concentration by means of the determination of brain waves.

After smelling the flavors of the chocolates of Examples 4 and 8, the brain waves of the panelists were determined and shown in FIG. 11. As apparent from FIG. 11, the value $\tau m$ of the chocolate of Example 4 according to the invention is lower than the value of $\tau m$ of Example 8. This shows that the chocolate of Example 4 enhances the mental concentration. With reference to two graphs as shown in the right of FIG. 11, the brain wave in the sleeping rest state as an index of unconcentrated condition and the wave in the mental calculation as an index of concentrated condition were measured for their $\tau m$ values wherein the brain waves were determined upon smelling neither chocolate aroma. By comparing these values, it will be apparent that the enhancement of the mental concentration by the chocolate of Example 4 is equal to a $\tau m$ value of 39.5 at the time of mental calculation.

(Experiment 10)

The proof-reading test of English Vocabulary was carried out with the chocolates of Examples 4 and 8, on a hundred fifty woman panelists of college students. The process of Experiment 4 was repeated. The results are shown in FIG. 12.

Figure 12:
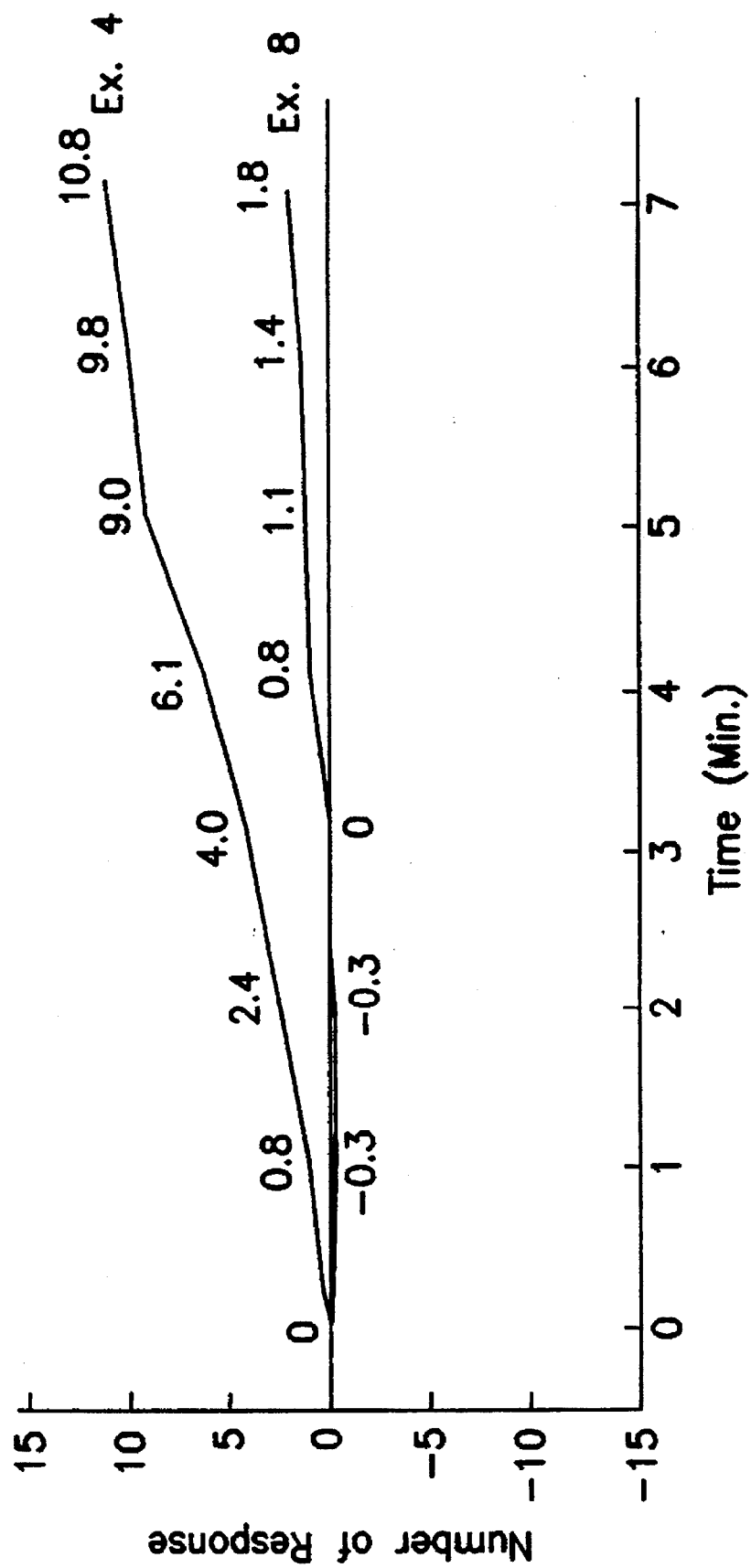
FIG. 12 is a graph showing results of proof-reading tests for English Vocabulary.

As apparent from FIG. 12, the number of responses after eating the chocolate of Example 4 according to the invention increases significantly relative to the chocolate of Example 8. This shows an improved efficiency of working.

TABLE 1

Tests for English vocabulary
(A Part of Questions)

| | | |
|---|---|---|
| 1. | sabulum | sabulem |
| 2. | porphyrins | perphyrins |
| 3. | oxyrhine | oxyrhine |
| 4. | prothesis | prothasis |
| 5. | buddha | buddhe |
| 6. | conquistador | conguistador |
| 7. | exultant | exultaint |
| 8. | gloucester | gloueester |
| 9. | haughty | hawghty |
| 10. | multiversity | multiwersity |

What is claimed is:

1. In a process for producing chocolate, comprising removing shells and germs from raw or semi-roasted cacao beans to prepare cacao nibs, adding alkali to said cacao nibs, stirring and drying and roasting the mixture of cacao nibs and alkali, grinding and pulverizing the alkali-treated cacao nibs, and mixing the ground and pulverized material with sugar and whole milk powder and cocoa butter and emulsifier to produce a body of chocolate; the improvement wherein said alkali is calcium hydroxide.

2. In a chocolate which comprises sugar and whole milk powder and cocoa butter and an emulsifier and a cacao mass, in which the cacao mass has been produced by removing shells and germs from raw or semi-roasted cacao beans to prepare cacao nibs, adding alkali thereto, stirring and drying and roasting the mixture of alkali and cacao nibs, and grinding and pulverizing the alkali-treated cacao nibs; the improvement wherein said alkali is calcium hydroxide.

\* \* \* \* \*